（12）United States Patent
Barnett

(10) Patent No.: US 7,461,498 B1
(45) Date of Patent: Dec. 9, 2008

(54) CROP HARVESTING HEADER WITH ROTARY DISKS AND CONVERGING SYSTEM FOR FORMING A SWATH

(75) Inventor: Neil Gordon Barnett, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 0 days.

(21) Appl. No.: 11/828,885

(22) Filed: Jul. 26, 2007

(51) Int. Cl.
*A01D 43/00* (2006.01)
*A01D 57/00* (2006.01)

(52) U.S. Cl. .................................................. 56/192
(58) Field of Classification Search ........... 56/6, 56/192, 153, 157, 255
See application file for complete search history.

(56) References Cited

U.S. PATENT DOCUMENTS

| 2,906,077 | A | | 9/1959 | Hale | |
|---|---|---|---|---|---|
| 3,014,324 | A | | 12/1961 | McCarty | |
| 3,772,865 | A | * | 11/1973 | Ruprecht et al. | 56/192 |
| 4,218,865 | A | * | 8/1980 | Chaumont et al. | 56/13.6 |
| 4,330,982 | A | | 5/1982 | Vissers | |
| 4,727,712 | A | * | 3/1988 | Zweegers | 56/192 |
| 5,272,859 | A | | 12/1993 | Pruitt | |
| 5,430,997 | A | * | 7/1995 | O'Halloran et al. | 56/6 |
| 5,433,064 | A | * | 7/1995 | Schmitt et al. | 56/6 |
| 5,463,852 | A | | 11/1995 | O'Harroran | |
| 5,768,865 | A | | 6/1998 | Rosenbalm | |
| 5,852,921 | A | * | 12/1998 | Neuerburg et al. | 56/6 |
| 6,158,201 | A | | 12/2000 | Pruitt | |
| 6,581,362 | B2 | | 6/2003 | Rosenbalm | |
| 6,718,743 | B2 | | 4/2004 | Rosenbalm | |
| 6,718,744 | B2 | * | 4/2004 | Rosenbalm et al. | 56/6 |
| 7,340,876 | B1 | * | 3/2008 | Barnett | 56/153 |
| 7,356,982 | B2 | * | 4/2008 | Barnett | 56/153 |
| 2005/0126142 | A1 | | 6/2005 | Rosenbalm | |
| 2008/0016837 | A1 | | 1/2008 | Rosenbalm | |

FOREIGN PATENT DOCUMENTS

| CA | 2166671 | 4/1997 |
|---|---|---|
| DE | 32 24 170 | 12/1983 |
| DE | 35 01 133 | 7/1986 |
| EP | 0 016 661 | 11/1986 |
| EP | 358045 | 11/1993 |

* cited by examiner

*Primary Examiner*—Árpád Fábián-Kovács
(74) *Attorney, Agent, or Firm*—Adrian D. Battison; Ade & Company Inc.

(57) ABSTRACT

A crop header has a cutter bar with generally horizontal flail disks driven about generally spaced upright axes. At least two of the disks are mounted outwardly of a discharge opening and the outermost disk carries an impeller and at least one additional impeller is mounted inwardly and rearwardly of the outer impeller to carry the crop inwardly. A discharge opening is defined in a rear wall inwardly of the outer disks and a swath converging apparatus is mounted in the mouth of the opening and is formed by two pairs of upstanding cylindrical rollers rotatable about their axes in a direction to carry the crop inwardly of the discharge opening. The pairs are mounted on respective top and bottom plates which pivot about the axis of the outer roller with the latter extending forwardly to overlap a floor plate of the cutter bar.

23 Claims, 11 Drawing Sheets

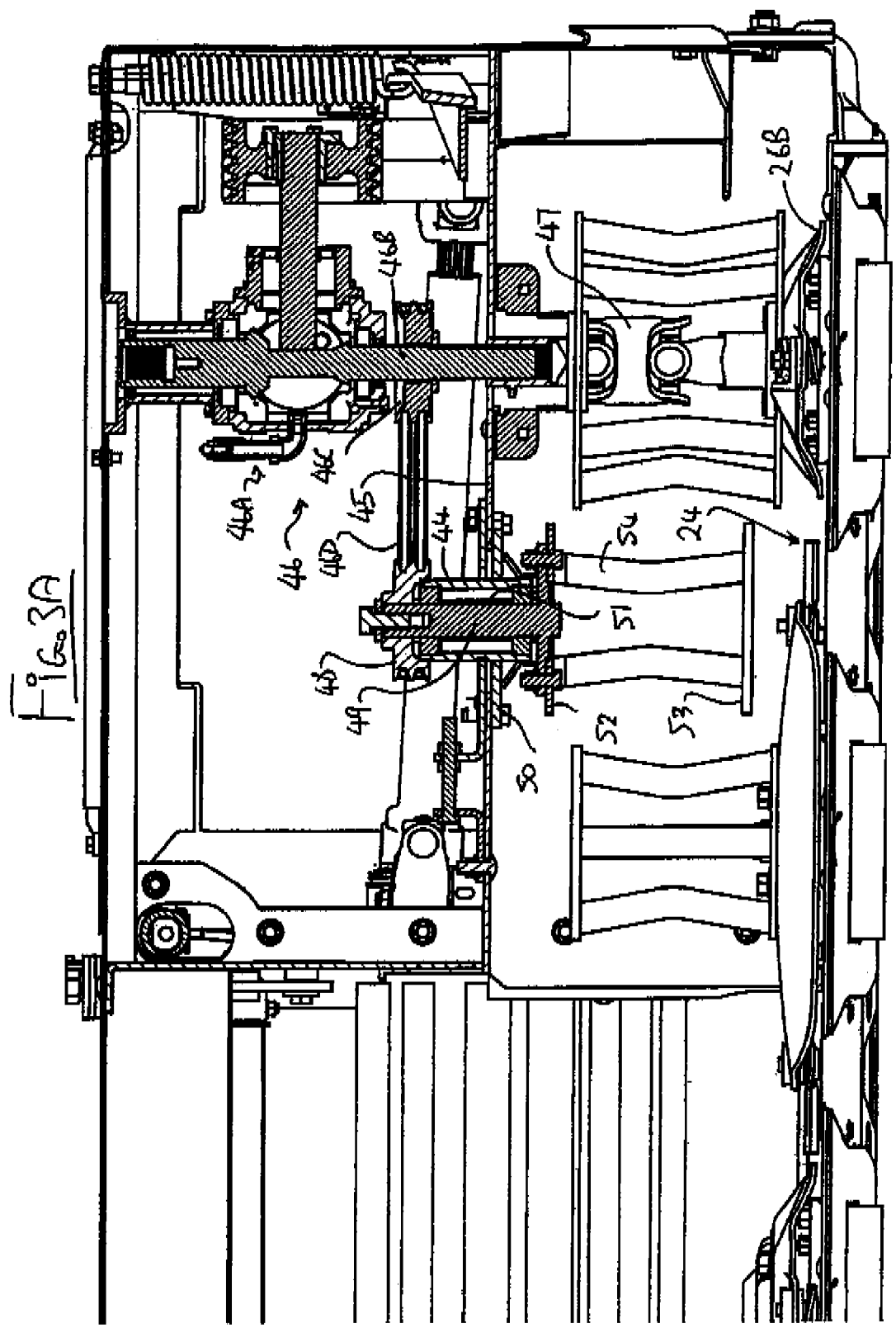

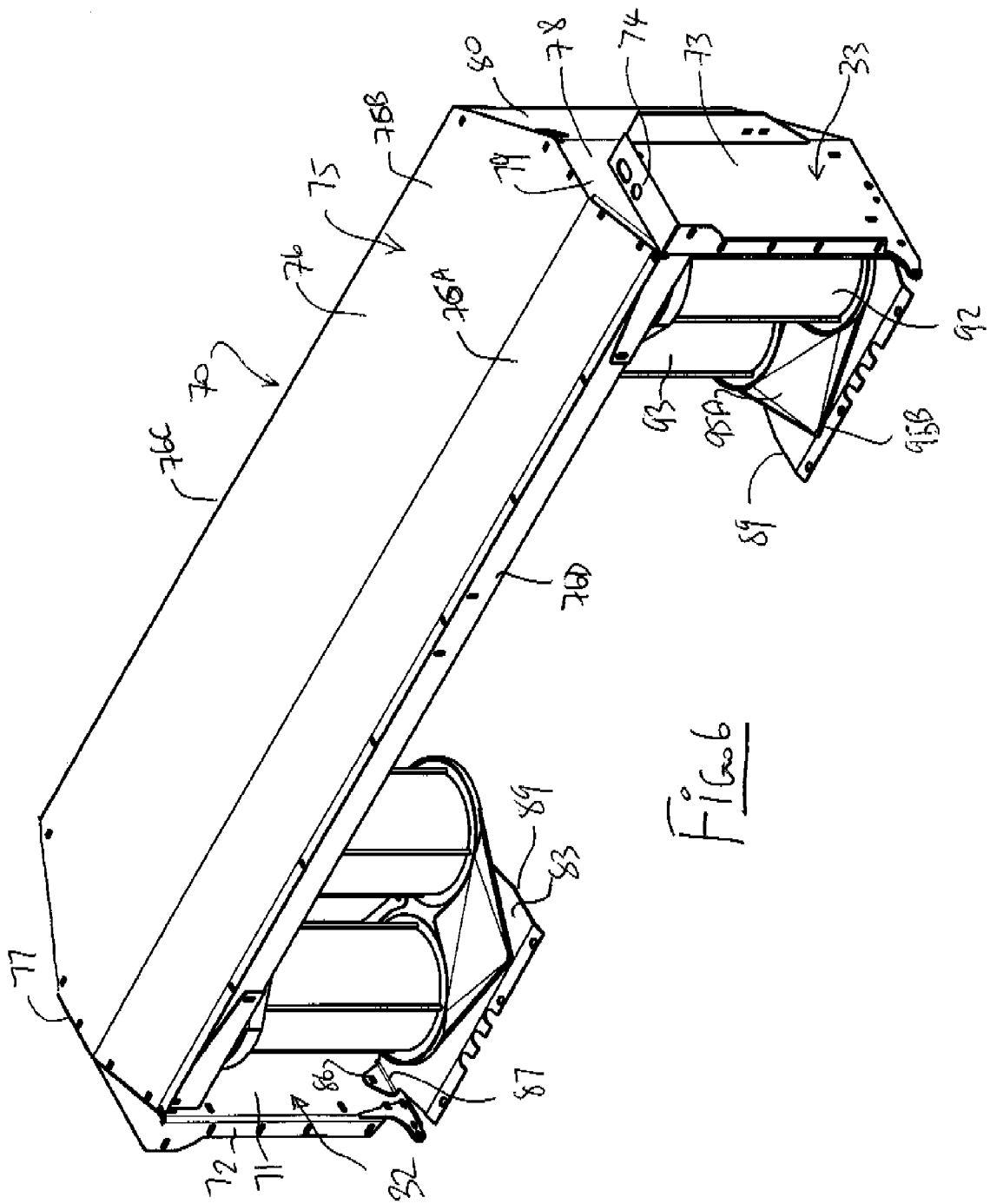

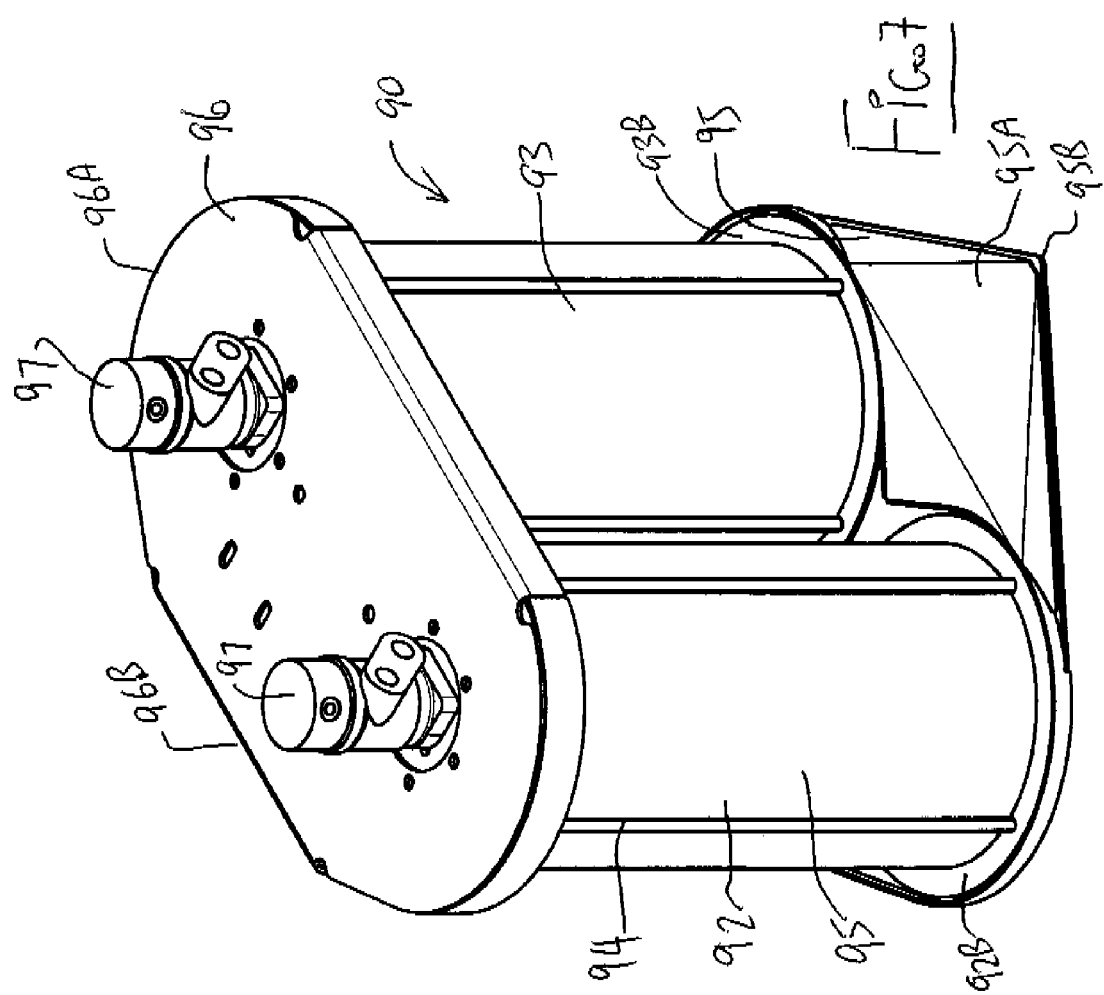

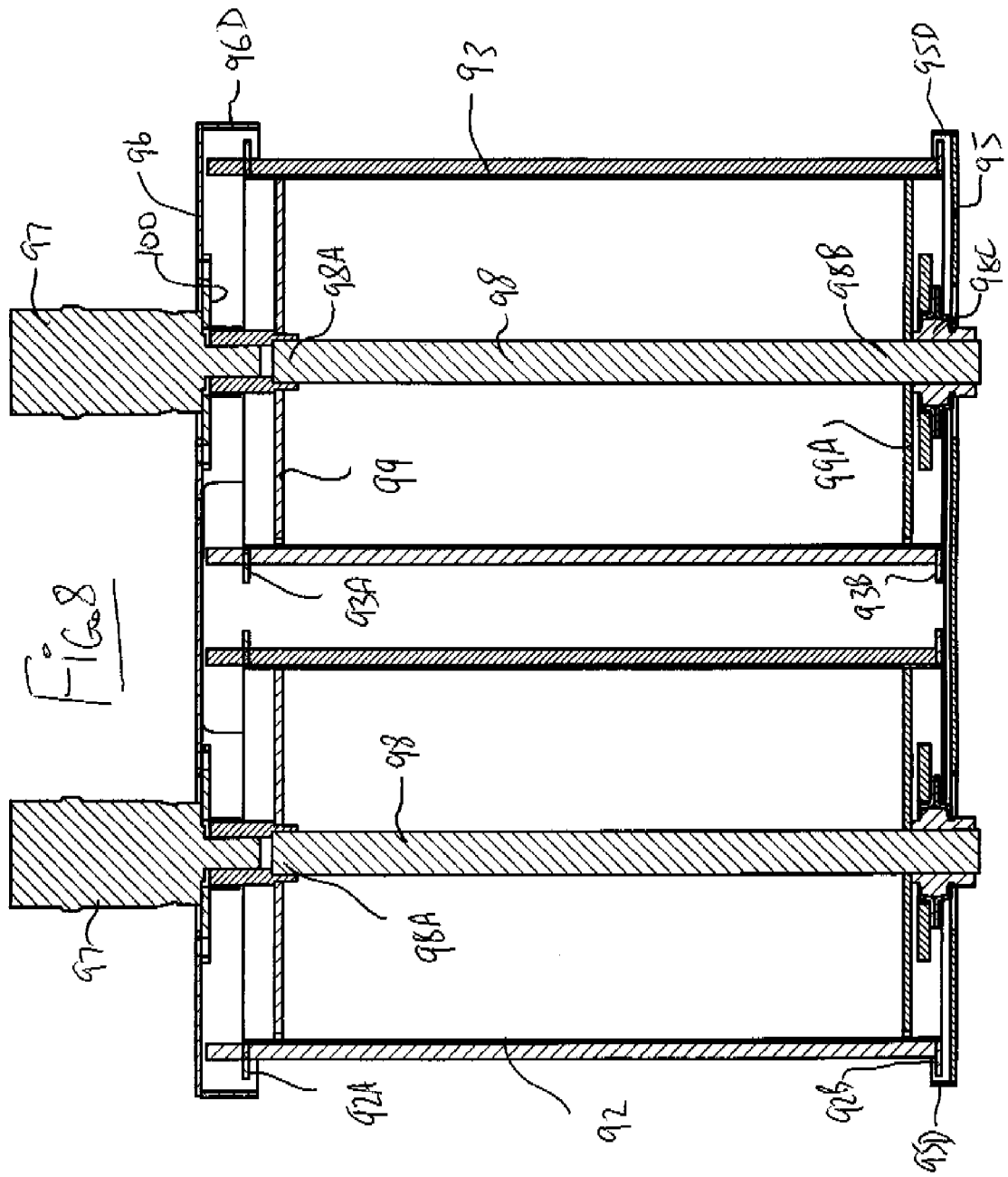

CROP HARVESTING HEADER WITH ROTARY DISKS AND CONVERGING SYSTEM FOR FORMING A SWATH

This invention relates to a crop harvesting header which has a cutter bar across the width of the header which carries and drives a plurality of transversely spaced rotary disks and particularly to an improved impeller for transferring the cut crop inwardly from outer disks to a discharge opening.

BACKGROUND OF THE INVENTION

Crop harvesting headers which use rotary cutters in replacement for the more conventional sickle knife systems have been available for many years. It is well known that such rotary cutters include a cutter bar or gear train which provides the main structural and drive communication components of the cutter. The cutter bar provides a series of longitudinally spaced vertical drive members each of which drives a respective one of a plurality of cutting disks at spaced positions along the cutter bar. The disks are mounted for rotation about a vertical axis standing upwardly from the cutter bar. The disks carry at a point on their outer edge a plurality, generally two, of flail type blades which rotate with the disk around the vertical axis in a cutting action.

The construction of the cutter bar itself including the suitable gear train is well known and a number of different designs are available which can be used by a person skilled in this art.

Examples of such rotary type cutters are shown in the following documents.

U.S. Pat. No. 5,272,859 (Pruitt) issued Dec. 28, 1993 discloses a mower/conditioner including a cutter bar and rotating disks feeding to a rear discharge opening containing a pair of conditioning rollers. The outermost disk carries a generally cylindrical impeller in the form of an upright cylindrical cage. In front of the discharge opening is a series of disks arranged in counter-rotating pairs.

US published Patent Application 2005/0126142 (Rosenbalm) assigned to Deere which discloses a cage type impeller where the bottom disk of the impeller is formed as a frusto-conical member converging upwardly and inwardly to the cage bars.

U.S. Pat. No. 5,768,865 (Rosenbalm) issued Jun. 23, 1998 assigned to Deere and Company discloses a rotary cutter system which has two end disks outboard of the central discharge opening with a conditioner arranged at the discharge opening for receiving the cut crop and providing a conditioning action. The conditioner can be either of a flail type or of a fluted roller type. The arrangement acts to transfer crop from outer cutters to the discharge opening using a drum type impeller on the outermost disk and guide surfaces of a particular shape behind the impeller and leading to the discharge opening U.S. Pat. No. 6,581,362 (Rosenbalm) issued Jun. 24, 2003 and assigned to Deere which discloses an arrangement for transferring crop from outer cutters to the discharge opening using an outer drum type impeller on the outermost disk and a second hanging drum type impeller rearward of the outer impeller and located at a position so that both the outermost disk and the next adjacent disk pass underneath the second impeller.

U.S. Pat. No. 6,718,743 (Rosenbalm) issued Apr. 13, 2004 and assigned to Deere which is a divisional of the above patent and discloses a particular construction for the drum type impellers.

U.S. Pat. No. 5,463,852 (O'Halloran) issued Nov. 7, 1995 and U.S. Pat. No. 5,433,064 issued Jul. 18, 1995 (Schmitt) assigned to Hay and Forage Industries of Hesston both show a construction of such a rotary cutter system in which there is a series of the cutter disks at spaced positions across the cutter bar with, at each end, two of the cutter disks extend beyond a central area in front of a discharge opening. In this arrangement the two end disks are driven by a mechanical drive system. The two end disks each carry a rotary transfer element in the form of a series of posts arranged at the periphery of a cylinder surrounding a vertical axis standing upwardly from the disk. The transfer elements act to carry the crop material which is cut by the disks inwardly toward the discharge opening. A conventional crop conditioner in the form of a pair of counter-rotating rollers is mounted across the crop discharge opening.

U.S. Pat. No. 6,158,201 (Pruitt) issued Dec. 12, 2000 also assigned to Hay and Forage Industries discloses a modification to the above 852 and 064 patents of HFI where a crop transport roller is added in the crop discharge opening and is arranged to carry crop up to the nip of the conditioner rollers.

U.S. Pat. No. 4,809,488 (Neuerburg) issued Mar. 7, 1989 assigned to Kuhn discloses a rotary cutter system which has a frusto-conical cage as the impeller on an end disk where a drive shaft extends into the top of the cage.

EP 358,045 (Ungruh) assigned to Niemeyer Sohne GmbH published Nov. 3, 1993 discloses a mower which has at least four cutting disks arranged in two pairs rotating in the same direction and feeding to the center. Above each disk carries a cylindrical impeller which has a surface running inwardly to carry the crop towards the centre. In the region between each of the disks of each pair is a further cylindrical impeller which assists in transporting the crops to the centre.

German 32 24 170 (Mortl) published Dec. 29, 1983 discloses a header having a discharge opening behind the outermost cutters of a group which includes four cutters. The group is arranged in two pairs with each pair rotating in opposite directions. Thus the outer cutter of the group rotates inwardly. Outboard of this cutter is provided a further cutter which also rotates inwardly as shown by the arrows. This reference also includes a pair of impellers, each mounted on a respective one of the two outer cutters which act as a conveying device for carrying the crop inwardly. The impeller is generally an upwardly tapered element of triangular cross section.

EP 0 016 661 (Maier) published Nov. 12, 1986 and assigned to Deutz Fahr discloses a cutter bar formed by a series of cutting disks where the end two disks at one end each carry a respective cylindrical impeller for carrying the cut crop to a discharge opening where there is located a conditioner.

German 35 01 133 (Schulze-Selting) published Jul. 17, 1986 also assigned to Deutz Fahr discloses a cutter bar formed by a series of cutting disks where the end disk at one end carries a respective cylindrical impeller for carrying the cut crop to an opening and there is provided an intermediate suspended impeller over the next disk where the suspended impeller is frusto-conical.

U.S. Pat. No. 4,330,982 (Vissers) issued May 25, 1982 and assigned to Multinorm discloses a series of rotary cutters with a pair of conditioning rollers which extend transversely or laterally across the mower narrower than the cutting zone and located in a discharge opening. A roller defines a portion or surface that moves upwardly and rearwardly from the cutting plane to the nip to convey the crop cut by the cutting disks toward the nip.

U.S. Pat. No. 2,906,077 (Hale) issued Sep. 29, 1959 discloses conditioner rollers in front of which is mounted a rotating roller which rotates to feed crop upwardly and rearwardly into the nip. Forwardly of the roller is located a sickle blade type cutter.

U.S. Pat. No. 3,014,324 (McCarty) issued Dec. 26, 1961 discloses a pair of conditioner rollers feeding into a nip therebetween. A roller is located in front of and below the nip of the conditioner roller and rotates in a direction to feed crop into the nip.

Canadian 2,166,671 (Savoie) published Apr. 6, 1997 discloses a disk cutter and a conveyor roller which feeds into the nip between a pair of conditioning rolls located in a discharge opening behind and narrower than the cutter.

From the above prior art patents, it will be noted that it is well known and widely used that each of two outermost disks carries a respective impeller body carried on the disk and driven by the disk about a common generally upright axis. These impeller bodies or members act to carry the crop as it is cut inwardly toward the discharge opening so that the crop can better enter the discharge opening with less chance of blocking or collecting in the area in front of the disks or within the discharge opening.

In many cases the discharge opening contains a conditioner for engaging and breaking or fracturing the crop to improve drying action as the swath is left in the field. Such conditioners can be of a number of different types but one common type uses a pair of fluted rollers which form a nip so that the crop is bent as it passes between the flutes.

Where a crop conditioner is used, a transfer roller is commonly used to lift the crop from the cutting zone to the nip of the conditioner rollers.

The different types of impellers used commonly at the outer cutting disks include drums which are of closed outer wall and cages which are formed of bars at angularly spaced positions around the axis. In most cases the impellers are cylindrical so that the cross section of the impeller is constant along the height of the impeller. In other cases the impeller is tapered so that its diameter decreases as the height increases so that it is either frusto-conical if circular in cross section or frusto-pyramidical if of square or triangular cross section.

In many cases the impellers are carried on and driven by the disks but in addition intermediate impellers, which are located at a position which is not aligned with one of the disks, can be supported and driven from above as a suspended or hanging impeller. These hanging impellers have the same shapes and construction, that is cylindrical or tapered, as the standing impellers at the disks.

Where no conditioner is used in the discharge opening, it is desirable to engage the crop with guide elements which act to consolidate the crop as the crop passes through the discharge opening to provide an improved structure of the swath which is laid on the ground behind the discharge opening.

Krone show in their brochure for the "Easycut" disk mower an arrangement of a seven disk machine and a six disk machine in which there is no conditioner and no discharge opening. In the seven disk machine the crop is carried on each side inwardly from behind the outer three disks by a pair of driven swath-forming drums mounted behind the disks and driven for rotation about a vertical axis. The pair includes a larger drum which is mounted behind the outer two disks and a smaller drum which is mounted in the region aligned with the space between the second and third disks. The axes of the larger and smaller drums are arranged on a line parallel to the cutter bar with their positions being fixed. The outermost disk carries a converging impeller in the form of a frusto-conical drum. In the six disk unit the inner smaller drums are omitted. The drums are connected with the disks mechanically by gears which act to communicate a drive input into one of the larger drums then across the disks to the opposite larger drum. This arrangement appears to be limited to the relatively narrow 6 and 7 disk machine and is clearly unsuitable for an 8, 10 or 12 disk machine.

The 995 disk mower of Deere has a converging system of the type shown in the above patent of Rosenbalm which acts to carry the crop to the discharge opening where the conditioner when provided is located. When the conditioner is omitted, a vertical converging roller is mounted immediately inward of the outer edge of discharge opening with a textured outer surface to transport the crop material inwardly of the width of the discharge opening. A second roller is also provided which has its axis inclined upwardly inwardly across the top of the swath so as to attempt to act to compress the side edges of the swath downwardly and inwardly for improved consolidation. This arrangement is designed for an 8 or 10 disk machine but is ineffective at providing a properly consolidated swath of a required width.

Neither of these arrangements is therefore entirely satisfactory.

SUMMARY OF THE INVENTION

It is one object of the invention to provide a crop harvesting header of the type having a series of rotary cutting disks on a cutter bar and particularly to provide an improved arrangement for forming a consolidated swath at the discharge opening.

According to a first aspect of the invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening narrower than a width of the cutter bar through which the cut crop is discharged for forming a swath behind the header;

the header frame including two walls each located at a respective end of the header frame and each extending behind at least one of the disks from the discharge opening outwardly toward the respective end of the header frame such that the cut crop material is converged inwardly in front of the wall to the discharge opening;

and a swath converging apparatus mounted at the discharge opening for converging sides of the swath to be laid on the ground behind the header;

the swath converging apparatus comprising two assemblies each of at least two rollers with one assembly on each side of the discharge opening;

said at least two rollers of each assembly each having an upstanding axis with an innermost one of the rollers being mounted with its axis inwardly of an outermost one of the rollers;

the rollers of each assembly each being driven for rotation about its axis in a direction to carry the crop inwardly of the discharge opening.

The number of rollers used in each assembly is preferably two but in some cases only a single roller or more than two rollers can be used.

Preferably each of the rollers has a substantially solid peripheral wall as this tends to reduce the possibility of wrapping but other constructions and shapes of a rotating member which defines the roller can be used.

Preferably each of the rollers is cylindrical but other shapes can be used such the "hour glass shape" described in the application referred to hereinafter.

Preferably each of the rollers has a plurality of longitudinal ribs on the outer wall.

Preferably the rollers have a height greater than that of the discharge opening.

Preferably at least the inner one of the pair is adjustable in a direction inwardly and outwardly of the discharge opening Preferably the pairs are connected for common adjustment movement of the inner rollers.

Preferably the common adjustment movement is effected by a hydraulic cylinder.

Preferably the inner one of the pair is mounted for pivotal movement about an axis at or adjacent to the axis of the outer one.

Preferably the inner and outer rollers of the pair are mounted on a common support.

Preferably the common support includes a top mounting plate and a parallel bottom mounting plate.

Preferably the axis of the inner roller is inward and rearward of the axis of the outer roller.

Preferably the rollers are driven by an adjustable hydraulic drive motor and each is preferably driven by a separate hydraulic motor independently of the others.

Preferably the inner and outer rollers of the pair are mounted on a common support including a top mounting plate and a parallel bottom mounting plate and wherein each of the rollers is connected rigidly to a motor shaft at a top end of the shaft at the top plate with a motor flange mounted at the top plate for floating movement relative to the top plate and with single spherical bearing connecting the shaft to the bottom plate at bottom to hold radial and thrust load.

Preferably the cutter bar includes a floor plate extending rearwardly to a position adjacent the pair of rollers.

Preferably the pair of rollers is mounted on a bottom plate which extends forwardly from the rollers to provide a guide surface tending to reduce the possibility of the crop hitting the ground in front of the rollers and preferably the bottom plate overlaps the floor plate.

Preferably the bottom plate converges to a front apex between the inner and outer rollers.

Preferably at least the outer one of the disks includes an impeller mounted thereon, upstanding therefrom and rotatable therewith to engage crop and provide contact therewith tending to carry the crop inwardly to the discharge opening.

Preferably on each side of the discharge opening, there are two outer disks arranged outwardly of the discharge opening and wherein there are three impellers at the outer disks arranged in a row across the outer disks so as to engage crop and provide contact therewith tending to carry the crop inwardly to the discharge opening.

According to a second aspect of the invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening narrower than a width of the cutter bar through which the cut crop is discharged for forming a swath behind the header;

the header frame including two walls each located at a respective end of the header frame and each extending behind at least one of the disks from the discharge opening outwardly toward the respective end of the header frame such that the cut crop material is converged inwardly in front of the wall to the discharge opening;

and a swath converging apparatus mounted at the discharge opening for converging sides of the swath to be laid on the ground behind the header;

the swath converging apparatus comprising two assemblies, each having at least one roller, with one assembly on each side of the discharge opening;

said at least one roller of each assembly having an upstanding axis and being driven for rotation about its axis in a direction to carry the crop inwardly of the discharge opening;

wherein said at least one roller of each assembly is driven by a hydraulic drive motor.

According to a third aspect of the invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening narrower than a width of the cutter bar through which the cut crop is discharged for forming a swath behind the header such that on each side of the discharge opening, there are two outer disks arranged outwardly of the discharge opening;

the header frame including two walls each located at a respective end of the header frame and each extending behind at least one of the disks from the discharge opening outwardly toward the respective end of the header frame such that the cut crop material is converged inwardly in front of the wall to the discharge opening;

wherein, on each sides there are three impellers at the two outer disks arranged in a row across the outer disks so as to engage crop and provide contact therewith tending to carry the crop inwardly to the discharge opening;

and a swath converging apparatus mounted at the discharge opening for converging sides of the swath to be laid on the ground behind the header;

the swath converging apparatus comprising two assemblies, each having at least one roller, with one assembly on each side of the discharge opening;

said at least one roller of each assembly having an upstanding axis and being driven for rotation about its axis in a direction to carry the crop inwardly of the discharge opening.

BRIEF DESCRIPTION OF THE DRAWINGS

FIG. 3A is view similar to that of FIG. 3 showing more detail of the drive components shown only schematically in FIG. 3.

FIG. 6 is an isometric view of the system of FIG. 5.

FIG. 7 is an isometric view of one pair of convergence rollers of FIG. 5.

FIG. 8 is a cross-sectional view of one pair of convergence rollers of FIG. 5.

In the drawings like characters of reference indicate corresponding parts in the different figures.

DETAILED DESCRIPTION

Attention is directed to co-pending application Ser. No. 11/087,774 filed Mar. 24, 2005 for BLADE FOR A CROP HARVESTING HEADER WITH ROTARY DISKS, the disclosure of which is incorporated herein by reference to show further details of the cutter disks and blades described hereinafter.

Attention is directed to co-pending application Ser. No. 11/193,631 filed Aug. 1, 2005 for CROP CONDITIONING ROLLER FLUTE SHAPE, the disclosure of which is incorporated herein by reference to show further details of the conditioning rolls described hereinafter.

Attention is directed to co-pending application Ser. No. 11/521,615 filed Sep. 15, 2006 for CROP HARVESTING HEADER WITH ROTARY DISKS AND IMPELLERS FOR TRANSFERRING THE CROP INWARDLY TO A DISCHARGE OPENING the disclosure of which is incorporated herein by reference.

Attention is directed to co-pending application Ser. No. 11/675,161 filed Feb. 15, 2007 for CROP HARVESTING HEADER WITH ROTARY DISKS AND IMPELLERS FOR TRANSFERRING THE CROP INWARDLY TO A DISCHARGE OPENING", the disclosure of which is incorporated herein by reference.

Figure 1:
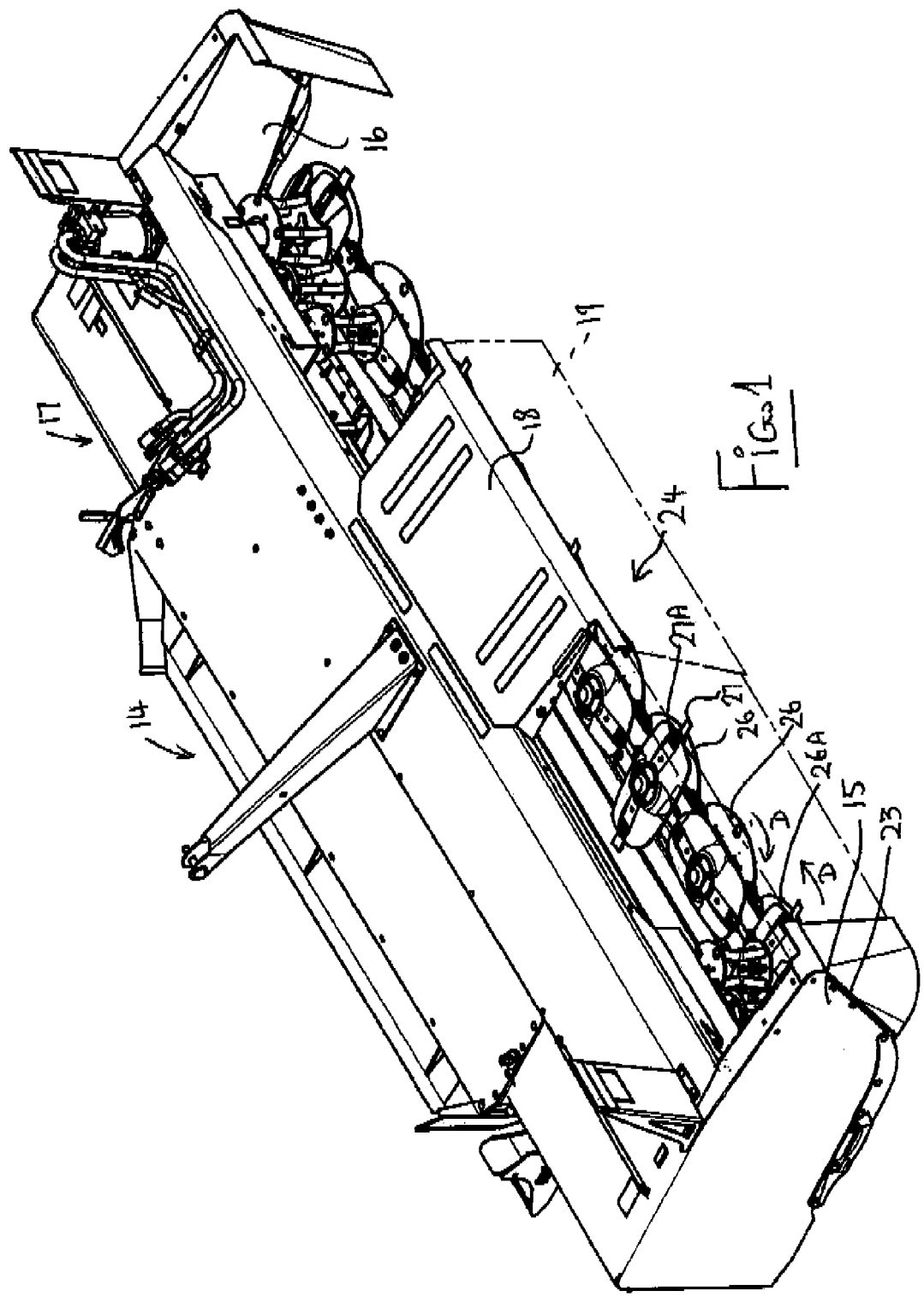
FIG. 1 is an isometric view showing generally a header of the type with which the present invention is preferably concerned.
Figure 2:
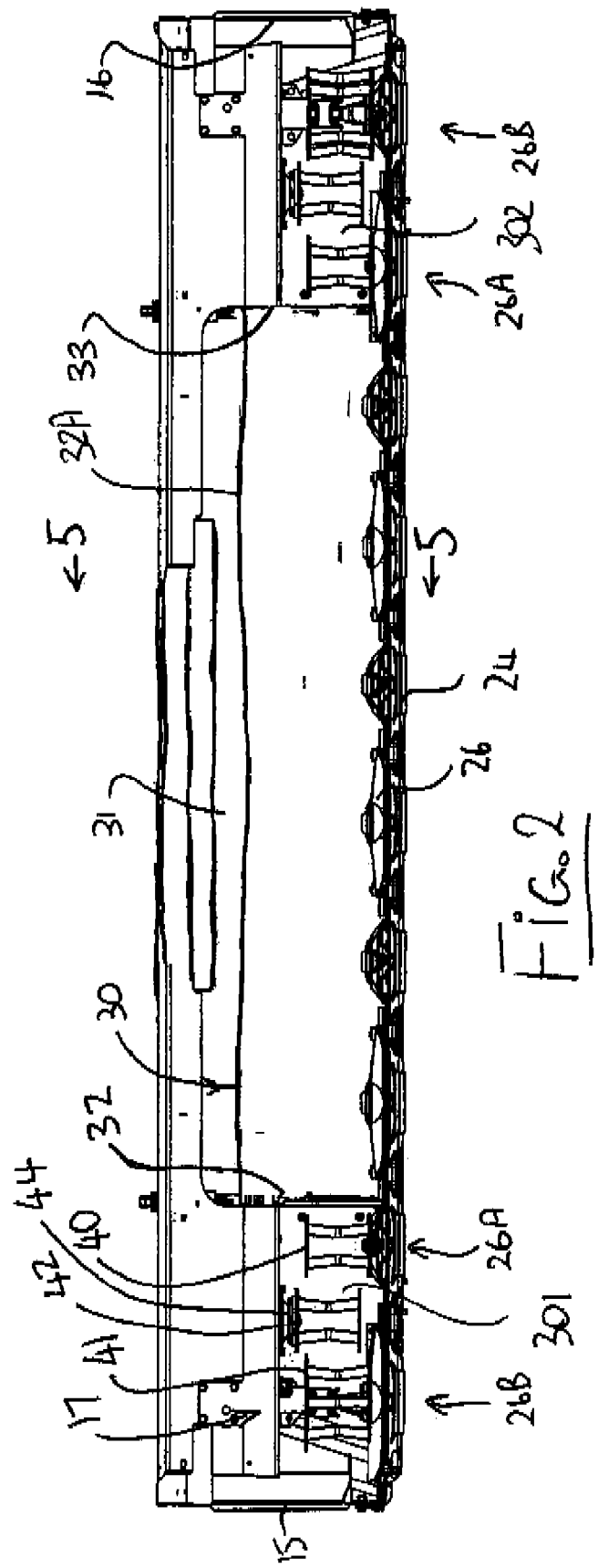
FIG. 2 is a front elevational view of the header of FIG. 1.

In FIG. 1 is shown schematically a header for attachment to conventional swather tractor of the well known type having driven ground wheels and rear castor wheels. A front support assembly of the tractor carries the header 14 including left and right lift arms which carry the header in a floating action across the ground along skid plates (not shown) of the header.

The header includes side walls 15 and 16 forming part of a frame 17 attached to the conventional transport system of the tractor. The frame carries top covers 18 which support a front skirt 19 in front of the cutter bar so as to provide protection for persons in the vicinity of the header which could be impacted by objects accelerated by the high speed rotary cutting assembly described hereinafter. Two doors and associated shields are not shown to provide a view inside the header.

The frame 17 includes a main transverse beam which is attached to the tractor. The main beam carries the side walls 15 and 16. The side walls each comprises a vertical wall extending forwardly to a front edge 23 in front of the cutter bar which is generally indicated at 24. The side wall is vertical and provides the front edge 23 lying in a vertical plane of the side wall so as to confine crop material to the interior of the header between the side walls for cutting action effected by the cutter bar 24.

Within the cutter bar 24 is provided a gear train (not shown) of meshing gears carried on suitable bearings so as to provide communication of drive of a number of vertical shafts carried on the cutter bar each for rotating a generally horizontal disk 26 about a vertical axis of the shaft. The disks are substantially identical. The disks are generally elliptical in shape so that a length between two ends 26A and 26B is significantly greater than a distance between the side edges in a direction at right angles to the length. At each of the ends 26A and 26B is mounted a respective one of a pair of flails 27 each for pivotal movement about a flail mounting pin 27A. The mounting pins are arranged at the ends and thus at the maximum extent of the disk so that the flails project outwardly beyond the edges of the disk for rotation in a common horizontal plane generally parallel to the plane of the cutter bar in a cutting action.

The disks are intermeshed so as to driven synchronously and they are arranged at 90° phase difference so that adjacent pairs of the disks are at 90° offset as they rotate to avoid interference between the disks and the blades 27 carried thereby.

The cutter bar is wider than a discharge opening 30 with rear walls 301 and 302 behind the outer disks and the impellers on respective sides of the discharge opening 30. Thus the crop material passes over the disks when cut and also must be converged from the full cut width into the discharge opening 30.

The cutter bar of this general construction is of a conventional nature and many examples of a commercial arrangement of this type are available in the market place. Thus the details of the cutter bar and its mounting are well known to one skilled in the art and further details can be obtained from such commercial devices, the details of which are incorporated herein by reference.

The discharge opening 30 has two side walls 32 and 33 which confine the crop material to pass through the discharge opening over a width less than the width of the header so that the side walls 32 and 33 are spaced inwardly from the respective end walls 15 and 18 of the header.

The disks 26 mounted on the cutter bar 24 include a series of disks which are located in front of the discharge opening 30. Outward of these disks and either side is provided a pair of outer disks indicated at 26A and 26B with the disk 26B outermost. These disks are arranged to rotate inwardly so that the front extremity and the blade carried thereby rotates in the direction indicated at the arrows D as shown in FIG. 1 to carry the crop material which is cut by those disks inwardly toward the discharge opening.

Each of the disks 26A and 26B carries a respective one of a plurality of impellers. Thus the disk 26A carries an impeller 40 and the disk 26B carries an impeller 41. In between these two impellers is mounted a third impeller 42.

Thus in the embodiment shown there are three impellers arranged to engage the crop material during or slightly after the cutting action so as to carry the crop material inwardly toward the end wall of the discharge opening. The number of impellers can be increased or decreased depending upon particular requirements or particular designs. Thus there may be only two impellers or there maybe more impellers. The impellers 40 and 41 are mounted on the respective disk so as to be carried thereby and driven thereby. The impeller 42 is carried on the frame 17 at a position above the cutter bar 24 so as to be a hanging impeller supported from a mounting system 44 above the impeller wherein there is provided a suitable bearing and also a suitable drive system within a frame member of the frame 17.

While the impellers 40 and 41 are mounted on the respective disks to be driven thereby, in an alternative arrangement, the impellers may be hanging impellers in the style of arrangement shown at impeller 42.

Figure 4:
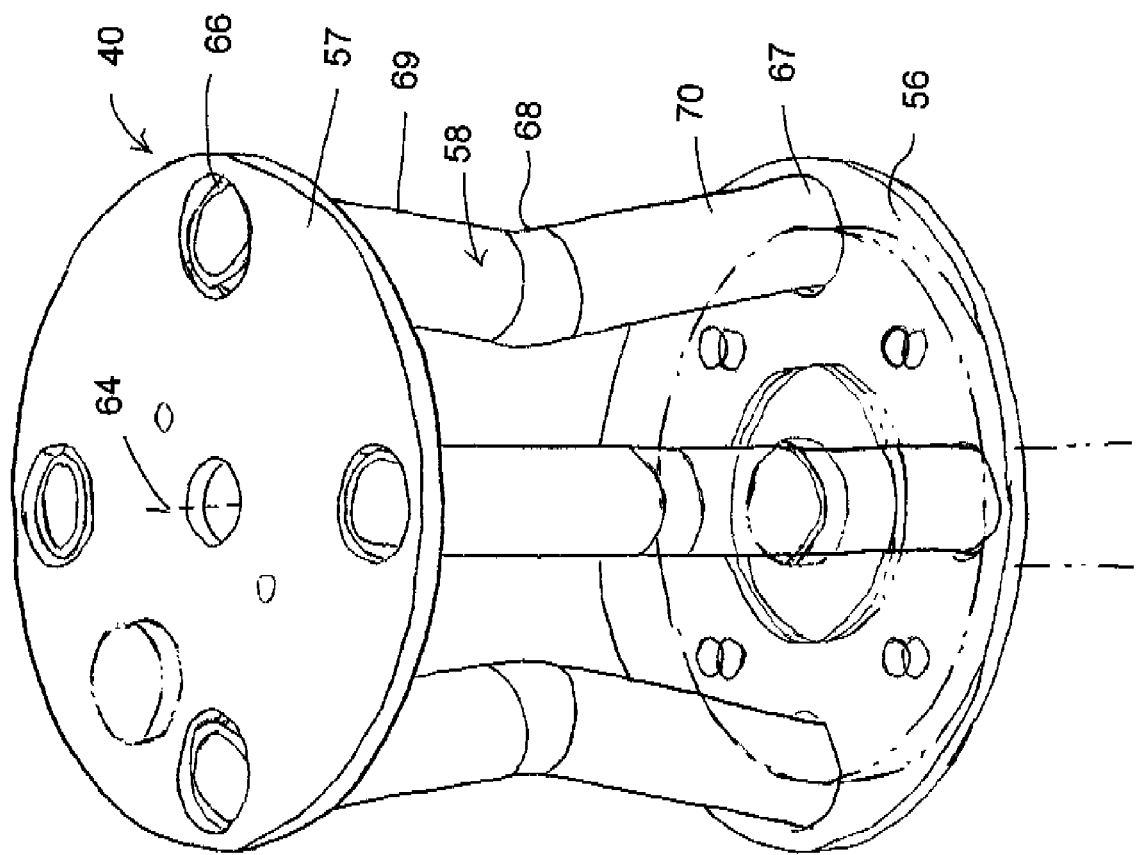
FIG. 4 is an isometric view of the impeller 40 of FIGS. 2 and 3.
Figure 4A:
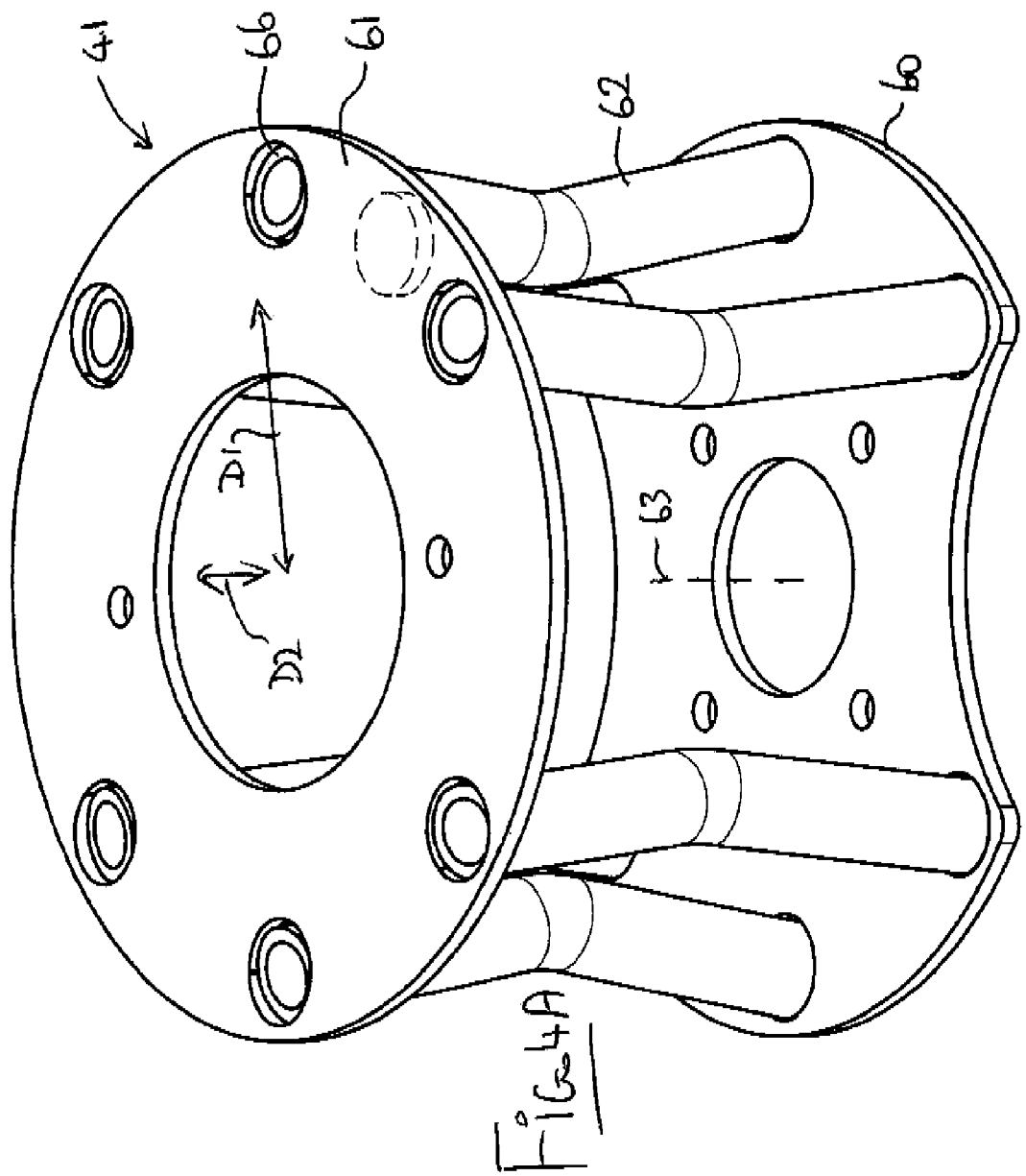
FIG. 4A is an isometric view of the impeller 41 of FIGS. 2 and 3.
Figure 4B:
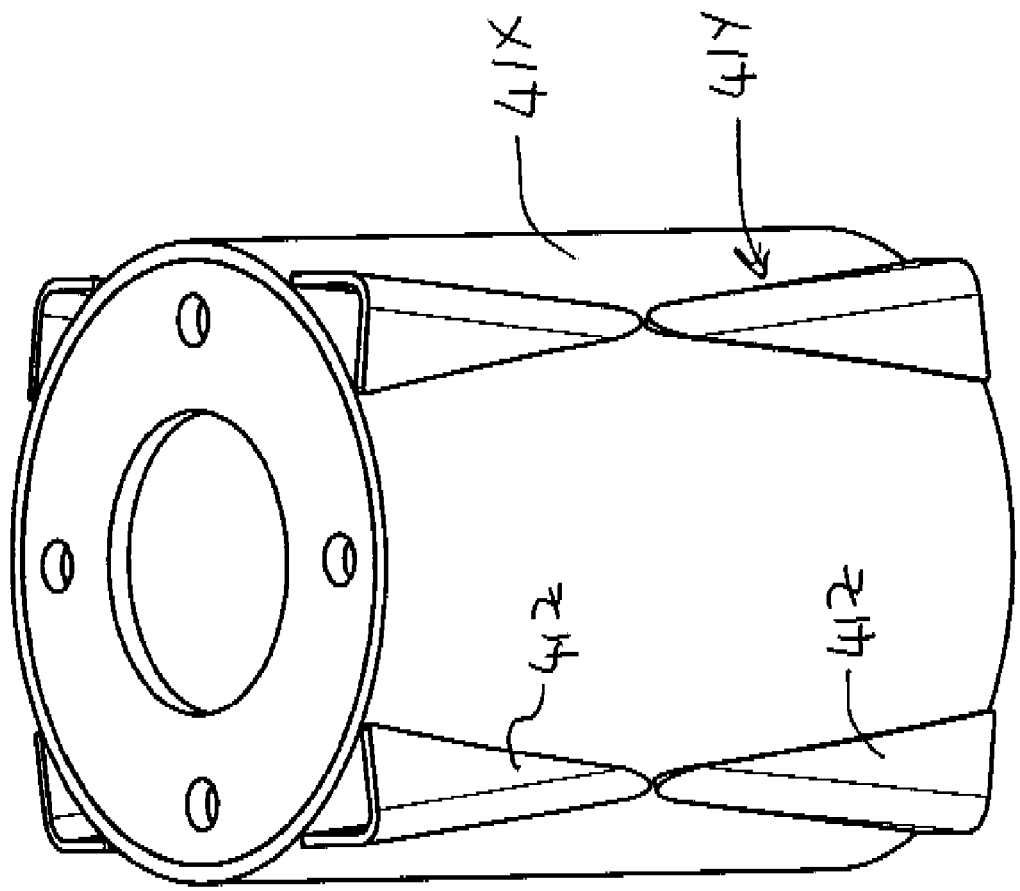
FIG. 4B is an isometric view of an alternative impeller for use in replacement for the impeller 41 of FIGS. 2 and 3.

An alternative construction of impeller is shown in FIG. 4B which has been built with a substantially solid peripheral wall to reduce aggressiveness and reduce build-up of crop on the converging member. This impeller has a solid peripheral wall which is cylindrical as shown at 41X and angularly spaced ribs or bars 41Y are attached to the wall 41X. Each bar 41X is formed of two parts 41Z which tapers in height and width from the end wall of the impeller to approximately a mid height of the impeller. Thus the bars 41Z lie on a larger circle at the ends of the impeller than at the mid height of the impeller thus simulating the "hour glass" shape of the cage type impeller shown in FIG. 4A but with the wall between the bars being closed or solid.

The impellers 40 and 41 are directly co-axial with the respective disk, 26A and 26B. Hanging impellers to replace these impellers may be also co-axially arranged with the corresponding disk or the axes of the impellers may be offset from the axes of the disks. It will be appreciated that the disks and the impellers co-operate to assist in carrying the crop material inwardly toward the discharge opening and to resist the crop material from moving rearwardly over the disks 26A and 26B to a rear bulkhead panel which could cause collection of the crop material and eventual blockage of the system.

Figure 3:
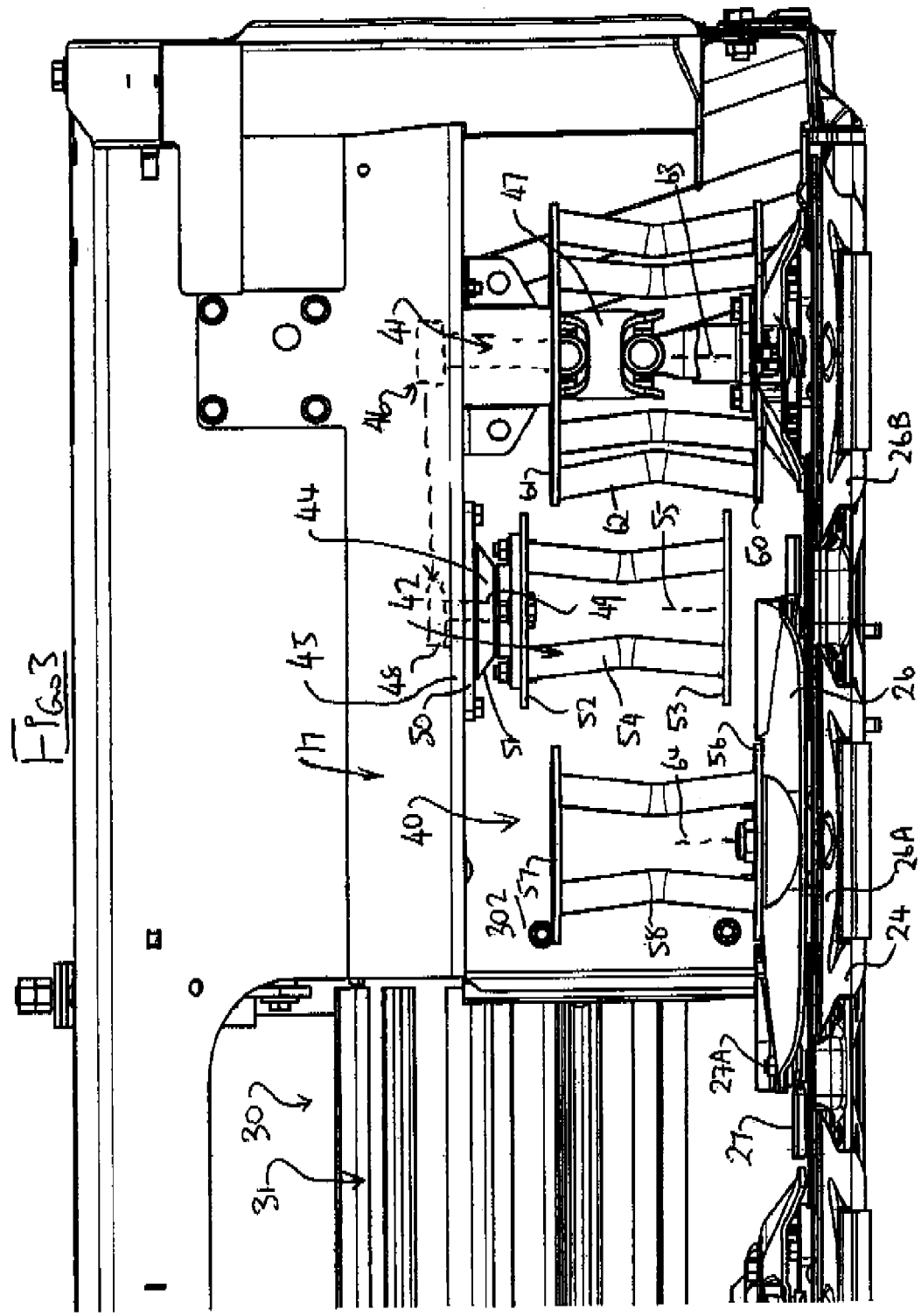
FIG. 3 is a front elevational view of the header of FIG. 1 on an enlarged scale showing one end only of the header, the other end being symmetrical.

As shown in more detail in FIGS. 3 and 3A, the frame 17 includes a frame member 45 within which is mounted a drive shaft and drive system generally indicated at 46 and shown in more detail in FIG. 3A. This drive system 46 provides drive through a gear box 46A to a drive shaft 46B and drive link 47 to the end disk 26B to provide drive into an end gear of the cutter bar 24. The drive 46 also provides a drive communication by a pulley 46C and belt 46D to a drive coupling 48 which is connected to a drive shaft 49 of the hanging impeller 42. The mounting 44 of the hanging impeller 42 includes a base plate 50 attached to the frame member or plate 45 together with a bearing arrangement 51 through which the shaft 49 passes.

The hanging impeller comprises a top plate 52 and a bottom plate 53 defining top and bottom ends of the impeller 42 respectively. Between these end plates 52 and 53 is provided a series of bars 54 at spaced positions around an axis 55 of the impeller 42.

The impeller 40 shown in FIG. 4 similarly comprises a bottom plate 56 and a top plate 57. In this arrangement the bottom plate 52 is bolted directly onto the top of the respective disk 26A. The top plate 57 is thus supported at a spaced position from the bottom plate 56 by the upstanding bars 58 which connect the top and bottom plates. The bars 54 are substantially identical to the bars 58 providing impellers 42 and 40 which are substantially identical in height and diameter. However this relationship is not essential and these impellers may be of different dimensions and constructions.

The impeller 41 shown in FIG. 4A is similar to the impeller 40 in that it includes a base plate 60 bolted to the top of the end disk 268. The impeller further includes a top plate 61 and a series of bars 62. The height of the impeller, 41 that is the distance between the top and bottom plate, is equal to the height of the other impellers. In this way the top and bottom plates of the impeller 40 and 41 are aligned in height across the width of the header.

However the impeller 41 is oval in that it is larger in dimension in a direction D1 than the diameter of the impeller 40 relative to its axis 63 and is equal in dimension, in a direction D2 at right angles to the first direction D1, to the diameter of the impeller 40. The bars 58 on the impeller 40 58 are angularly spaced around the respective axis 64 with the distance between the bars being substantially equal in many cases although the distances between bars is not necessarily equal as there can be at the end impellers a large spacing for installation of the driveline aligned with the blades of the discs where there is less requirement to engage crop.

The bars 62 on the impeller 41 are located at a greater diameter from the axis 63 than the bars 58 on the impeller 40 and there are a larger number of the bars 62 than bars 58. Thus the impeller 40 as shown in more detail in FIG. 4 has only four bars at 90° spacing whereas the impeller 41 has six bars at 45° spacing at a larger diameter. As the impeller 41 is oval in plan, the bars 62 are not equidistantly spaced around the full periphery but are arranged in groups of three at the ends of the larger dimension with a larger spacing along the sides at the smaller dimension.

As best shown in FIGS. 4 and 4A, each of the bars 58 and 62 of the impellers 40 and 41 has a top end 66 at the top plate 57 and a bottom end 67 at the bottom plate 56. The top and bottom ends are suitably fastened to the top and bottom disks and in the embodiment shown this is effected by providing a hole in the respective disk within which the respective end is located. In the embodiment shown each of the bars 58 is formed by a tubular member of circular cross section. Each of the bars is bent at a central location 68 so as to form two inclined portions 69 and 70 which extend from the bent center section 68 upwardly to the top end and downwardly to the bottom end respectively. The bend is located so that the center of the bar is spaced inwardly toward the axis relative to the corresponding top and bottom ends. Each of the bars lies in an axial plane of the impeller. This forms for the impeller in effect a waist at the mid height between the top and bottom ends. The waist thus forms in effect a circle surrounding the impeller which is narrower than the bars at the top and bottom extremity. In this way the impeller is "hour-glass" shape with the waist formed at the mid height. This hour glass shape can be provided in the cage type impeller as shown in FIG. 4A or in the solid type of impeller as shown in FIG. 4B.

As the top and bottom plates of the impellers 40 and 41 are at the same height, the waist at the center is similarly located at the same height.

The impeller 42 is identical in size and construction to the impeller 40 but is located in a hanging arrangement from the upper rail 45 with the top and bottom plates raised slightly relative to the top and bottom plates of the impellers 40 and 41. Thus the central waist of the impeller 42 is at a raised height relative to the waists of the impellers 40 and 41.

In one example of the impeller 40 the amount of bending of the bars is such that a circle surrounding the bars at the waist is of the order of 15.5 cm in diameter as opposed to a circle surrounding the bars at the top and bottom ends which is 19 cm in diameter.

The bars are not necessarily circular in cross section and can be of different shapes to provide a more aggressive engagement with the crop. The circular cross section bars provide an action on the crop which is relatively non-aggressive so that it reduces the tendency of the impeller to grasp and hold portions of the crop which provides a tendency for wrapping of the crop around the impeller as it rotates. The smooth surfaces provided by the bars allow the crop to sweep over those surfaces as it moves inwardly away from each of the impellers toward the discharge opening. There are no sharp edges on the impeller bars which could act to cut into the crop and cause an engagement point tending to hold the crop against its required movement away from the impeller.

As the crop moves inwardly toward the discharge opening, the crop tends to lie with the stalks across the front of the header. The shaping of the impeller with the narrower waist thus tends to cause the crop to be cupped within the outer surface of the impeller so that less tendency for the crop materials to climb above the impellers. The crop material thus is cradled by the bars of the impellers as the crop material moves inwardly with the crop material tending to center at the central waist of the impellers. This arrangement has therefore provided an improved crop flow across the front of the impellers as the impellers rotate inwardly across their front surfaces toward the discharge opening.

Turning now to FIGS. 5 through 8, there is shown a converging apparatus generally indicated at 70 which is mounted in the discharge opening 30 between side walls 32 and 33 of the discharge opening. The apparatus 70 is thus located in the discharge opening that across the width of the discharge opening so as to be narrower than the width of the cutter bar and the header. The apparatus 70 comprises a first side wall 71 which is shaped to mount into the discharge opening at the side wall 32 of the discharge opening with flanges 72 which engage onto the construction of the header at the side wall 32. Symmetrically, a second end wall 73 includes flanges 74 which engage onto the end wall 33 of the discharge opening.

The apparatus 70 further includes a converging wall assembly 75 including a top wall 76 and side walls 77 and 78. Side walls 77 and 78 include a first rearwardly extending portion 79 which are parallel and thus parallel to the direction of movement of the header and at right angles to the cutter bar. The side walls 77 and 78 further include a rearwardly and inwardly inclined portion 80 which converges rearwardly and inwardly to a rear edge 81 which is spaced inwardly from the width of the discharge opening and inwardly from the side walls 72 and 73.

The top wall 76 includes an upwardly and rearwardly inclined front portion 76A and a horizontal portion 76B which extends rearwardly to a rear edge 76C lying in a common plane with rear edges 81. A protective curtain at the rear edge 76C may be provided.

The assembly 70 further includes a pair of floor plates 83 and 84 which have a front edge 85 attached to the cutter bar. These floor plates are also attached at side flanges 86 to the side walls 71 and 73 so that an outer side edge 87 of the floor plate 83 lies along the inside edge at the bottom of the side plate 71 and symmetrically an outside edge 88 of the floor plate extends along side the bottom edge of the side wall 73. The floor plates 83 and 84 also have an inside edge 89 which is spaced partway along the width of the discharge opening from the outside edges of the discharge opening so that the inner edges 89 are spaced by a central opening at which the swath is intended to be formed. This opening therefore is opened to the ground allowing the crop material discharging from the rear of the cutter bar in this area to fall downwardly to the ground to form a swath on the ground.

The apparatus 70 further includes two pairs 90 and 91 of swath converging rollers. The two pairs are symmetrical and arranged oppositely at opposite ends of the discharge opening so as to engage opposite sides of the swath passing through the discharge opening. Each pair as best shown in FIG. 7 comprises an outer roller 92 and an inner roller 93. Each of these rollers has an upright axis so that the axes are parallel and each of the rollers has a solid or imperforate peripheral wall so as to define in effect a drum which rotates around the axis of the roller. The drum has a series of longitudinally extending ribs 94 projecting outwardly from the outer surface 95. The ribs provide engagement with the crop so as to assist in frictional engagement with the crop so as to tend to carry the crop around the roller in the direction of rotation of the roller. The rollers are closely adjacent in the area between the rollers so that crop material can be transferred from the outer roller to the inner roller as the rollers rotate in a common direction tending to transfer the crop inwardly of the discharge opening from the outside wall 32, 33 inwardly to the opening between the edges 89.

The rollers 92 and 93 are supported on a bottom plate 95 and a top plate 96 which are spaced by the height of the rollers. The top plate 96 covers the top end of each of the rollers so that it has semi-circular ends 96A and joining sides 96B. The bottom plate 95 is similarly shaped to engage around the bottom end of the roller but also includes a forwardly projecting portion 95 which converges toward an apex 95B symmetrically located between the rollers in front of the rollers.

Each of the rollers is driven by a respective hydraulic motor 97 so that all of the rollers are driven independently of one another. Control of the speed of the rollers can therefore be effected using a central control system which supplies fluid at a predetermined rate to each of the rollers to provide independent control. Thus for example the inner rollers may be driven at a different speed from the outer rollers.

As best shown in FIG. 8, the motors 97 are rigidly attached to an upper end 98A of a motor drive shaft 98. The motor drive shaft 98 connects to the peripheral wall of the respective roller by top and bottom plates 99 and 99A attached to the shaft at an inner opening and extending outwardly so that a peripheral edge of the respective plate attaches to the peripheral wall to communicate drive from the shaft to the wall.

The shaft 98 is carried at its lower end 98B in a spherical bearing 98C attached to and carried by the bottom plate 95. The spherical bearing mounts the bottom plate of the motor shaft 98B so that the respective roller is mounted for rotation about the axis defined by the spherical bearing at the bottom plate 95. At the upper end the motor and shaft are attached to a motor flange 100 which is carried in the top plate 96 in a manner allowing slight floating movement of the plate 100 relative to the top plate 96. In this way slight side to side movement of the roller can occur relative to the top plate to accommodate twisting. In this way the roller is mounted for rotation about the axis defined by the bottom spherical bearing 98C in an effective inexpensive manner requiring only a single bearing and allowing the necessary flexing movements to occur.

The top plate 96 includes a down-turned flange 96D which surrounds a top flange 93A of the roller 93 and a top flange 92A of the roller 92. This inter-engagement between the flanges 92A and 93A which are horizontal to the vertical flange 96D inhibits the entry of crop or other materials which may reach the top of the roller. Symmetrically the bottom of the roller includes an out-turned horizontal flange 93B, 92B which co-operates with an upturned vertical flange 95D of the bottom plate.

The rollers 92 and 93 are essentially the same height as the maximum vertical height under the frame. This height is rarely required, except when tall, lodged bushy crops enter the header "heads first".

Figure 5:
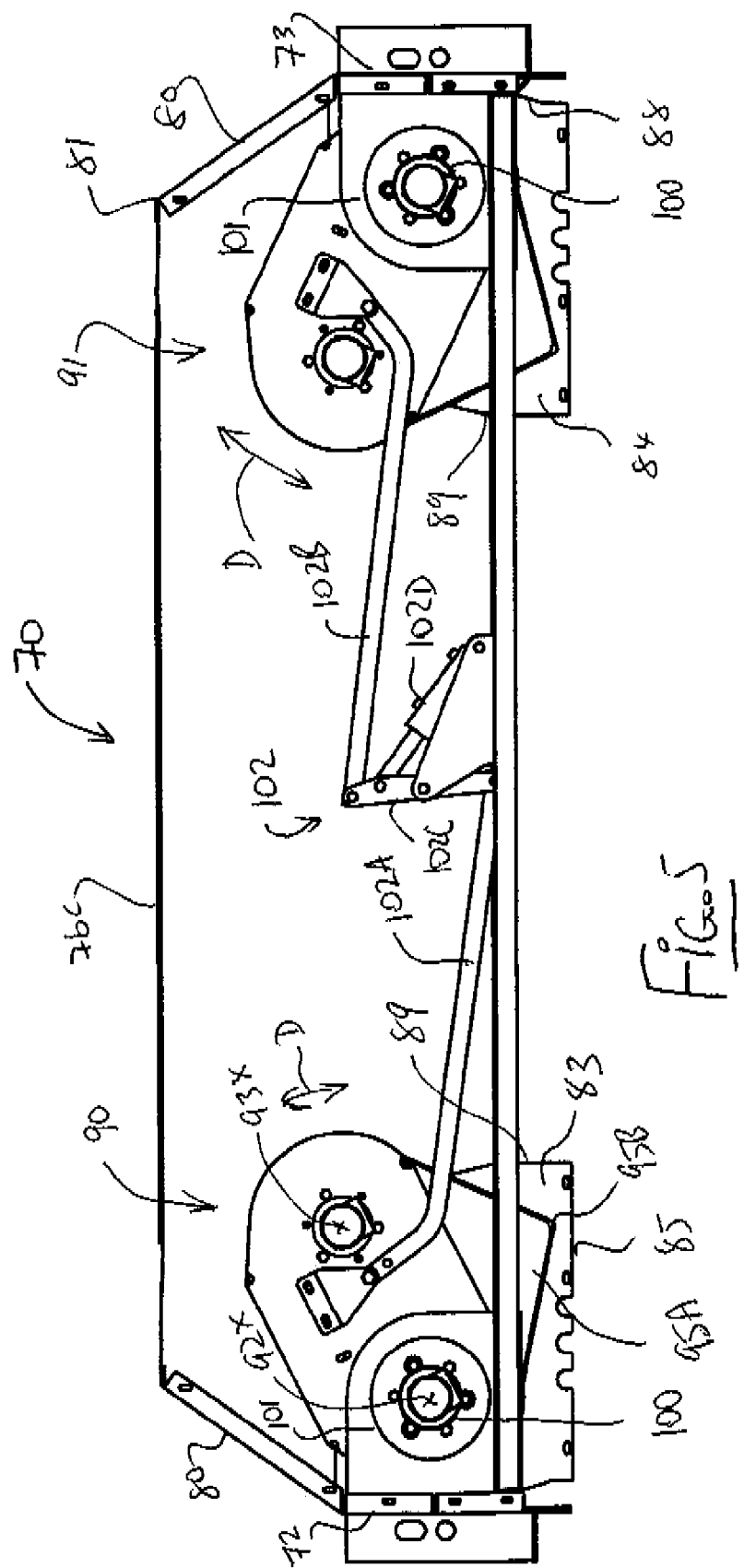
FIG. 5 is a top plan view of a swath convergence system to be mounted in the discharge opening of the rotary mower shown in the above figures.

As best shown in FIGS. 5 and 6, the pairs of rollers are arranged so that the outer roller 92 of the pair is closely adjacent the side wall 73, 72. A front edge of the roller is just behind the front edge of the side plate 73. Thus crop material passing around the front edge into the discharge opening firstly engages the surface of the outer roller 92 which is moving inwardly relative to the opening.

The roller 93 which is the inner roller is positioned so that its axis 93X is located inwardly and rearwardly relative to the axis 92X of the roller 92. Thus the crop material crossing across the front face of the roller 92 then encounters the roller 93 which is rotating in the same direction that is inwardly and rearwardly of the discharge opening so that the crop material is carried by both of the rollers inwardly into the area between the edges 89 where the swath is formed.

The motor flange 100 of the outer roller 92 is carried in a mounting plate 101 fixed to the end wall 72, 73. This mounting plate therefore extends across the top of the structure underneath the top housing wall 76 and provides a fixed position for the top end of the roller 92. The top and bottom plates of the pair of rollers are then free to swivel around the axis defined by the motor shaft 98 of the outer roller. In this way the top plate can move inwardly and outwardly as indicated by the direction of arrow D to provide an adjustment of the position of the inner roller 93 relative to the outer roller 92.

During this adjustment movement, the forward extension portion 95A of the bottom plate 95 sweeps across the top of the floor plate 83, 84 so as to provide an inter-engagement between these plates which prevents the crop material from dropping downwardly in this area and downwardly between the rear of the cutter bar and the pair of rollers. Thus any crop moving rearwardly behind the cutter at this area in front of the pair of rollers is carried by the bottom plates and is engaged onto the rollers which tend to move the crop material inwardly and rearwardly over the surfaces of the rollers into the swath discharge area between the inner edges 89.

As best shown in FIG. 5, common adjustment of the angle of the pair of rollers around the axis 92X is effected by a lever system generally indicated at 102 and including a pair of levers 102A and 102B together with a central crank 102C operated by a hydraulic cylinder 102D. Operation of the hydraulic cylinder therefore acts to commonly and symmetrically move the pairs of rollers around the axis of the respective outer roller so as to move the inner roller inwardly or outwardly depending upon the operation of the cylinder With the conditioning system therefore removed from the header described in the above previous patent applications identified above, the conditioning roller system can be replaced by the swath converging system 70 described above. This swath converging system can be simply bolted into place into the discharge opening. The swath converging system therefore co-operates with the impeller converging system on the cutter bar so that the crop material is initially converged inwardly to enter the discharge opening whereupon the crop material encounters the crop converging rollers of the two pairs of rollers. These are adjusted so that the crop material is properly engaged by the rollers and carried by the rollers to a required width of the eventual swath with the rollers acting to compress and converge the crop material to a swath width.

Typically the width of the discharge opening may be in the range 3000 mm between end panels of discharge opening and the eventual swath width can be reduced to a with in the range 1200 to 2000 mm by adjusting the position of the inner roller around the axis of the outer roller. Width control can also be effected by both position and speed.

The crop is thus controlled in its movement through the system and discharges in the central discharge area between the edges 89 of the floor plates as a properly controlled and compressed structure.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop harvesting header comprising:
a header frame arranged to be transported across ground on which there is a standing crop for harvesting;
a cutter bar mounted on the header frame across a width of the header for movement across the ground for harvesting the standing crop;
a plurality of generally horizontal cutter disks mounted on the cutter bar at positions spaced transversely of the header with the disks being mounted on the cutter bar for driven rotation about respective generally upright axes spaced along the cutter bar;
each disk having mounted thereon at a position spaced outwardly from the respective axis thereof at least one cutter blade such that rotation of the disk about its axis causes a standing crop to be cut by the blade as it rotates around the axis on the disk;
the header frame defining a discharge opening defined by spaced upstanding side walls located at a spacing narrower than a width of the cutter bar through which the cut crop is discharged for forming a swath behind the header;
the header frame including two walls each located at a respective end of the header frame and each extending behind at least one of the disks from a respective one of the side walls of the discharge opening outwardly toward the respective end of the header frame such that the cut crop material is converged inwardly in front of the wall to the discharge opening;
and a swath converging apparatus mounted at the discharge opening for converging sides of the swath to be laid on the ground behind the header;
the swath converging apparatus comprising two assemblies each of at least two rollers with each assembly mounted at a respective side wall of the discharge opening;
said at least two rollers of each assembly each having an upstanding axis with an innermost one of the rollers being mounted with its axis inwardly of an outermost one of the rollers and at least the innermost one of the rollers being mounted so as to be located wholly inwardly of the respective side wall of the discharge opening;
the rollers of each assembly each being driven for rotation about its axis in a direction to carry the crop inwardly of the discharge opening.

2. The header according to claim 1 wherein each of the rollers is mounted so as to be located wholly inwardly of the respective side wall of the discharge opening.

3. The header according to claim 1 wherein each of the rollers is cylindrical.

4. The header according to claim 1 wherein each of the rollers has a plurality of longitudinal ribs on the outer wall.

5. The header according to claim 1 wherein at least the innermost one of the rollers of the assembly is adjustable in a direction toward and away from the respective side wall of the discharge opening.

6. The header according to claim 5 wherein the swath converging apparatus includes an actuator and a linkage driven by the actuator and connected between the two assemblies for effecting common adjustment movement of the innermost rollers of the two assemblies.

7. The header according to claim 6 wherein the actuator is a hydraulic cylinder.

8. The header according to claim 5 wherein the innermost one of the rollers of the assembly is mounted for pivotal movement about an axis at or adjacent to the axis of the outer one.

9. The header according to claim 1 wherein the innermost and outermost rollers of the assembly are mounted on a common support.

10. The header according to claim 9 wherein the common support includes a top mounting plate and a parallel bottom mounting plate.

11. The header according to claim 1 wherein the axis of the innermost roller is inward and rearward of the axis of the outermost roller.

12. The header according to claim 1 wherein the rollers are driven by a hydraulic drive motor which allows adjustment of the rate of rotation thereof.

13. The header according to claim 12 wherein each of the rollers is driven by a separate hydraulic motor independently of the others.

14. The header according to claim 13 wherein the inner and outer rollers of the assembly are mounted on a common support including a top mounting plate and a parallel bottom mounting plate and wherein each of the rollers is connected rigidly to a motor shaft at a top end of the shaft at the top plate with a motor flange mounted at the top plate for floating movement relative to the top plate and with single spherical bearing connecting the shaft to the bottom plate at bottom to hold radial and thrust load.

15. The header according to claim 1 wherein the cutter bar is arranged underneath the cutter disks for driving the cutter disks and includes a floor plate extending rearwardly from the cutter bar to a position adjacent the pair of rollers and arranged to prevent cut crop from falling to the ground in front of the pair of rollers.

16. The header according to claim 1 wherein the assembly of rollers is mounted on a bottom plate which extends forwardly from the rollers to provide a guide surface tending to reduce the possibility of the crop hitting the ground in front of the rollers.

17. The header according to claim 16 wherein the cutter bar includes a floor plate extending rearwardly to a position adjacent the pair of rollers and wherein the bottom plate overlaps the floor plate.

18. The header according to claim 16 wherein the bottom plate converges to a front apex between the inner and outer rollers.

19. The header according to claim 1 wherein at least the outer one of the disks includes an impeller mounted thereon, upstanding therefrom and rotatable therewith to engage crop and provide contact therewith tending to carry the crop inwardly to the discharge opening.

20. The header according to claim 1 wherein, on each side of the discharge opening, there are two outer disks arranged outwardly of the discharge opening and wherein there are three impellers at the outer disks arranged in a row across the outer disks so as to engage crop and provide contact therewith tending to carry the crop inwardly to the discharge opening.

21. A crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening defined by spaced upstanding side walls located at a spacing narrower than a width of the cutter bar through which the cut crop is discharged for forming a swath behind the header;

the header frame including two walls each located at a respective end of the header frame and each extending behind at least one of the disks from a respective one of the side walls of the discharge opening outwardly toward the respective end of the header frame such that the cut crop material is converged inwardly in front of the wall to the discharge opening;

and a swath converging apparatus mounted at the discharge opening for converging sides of the swath to be laid on the ground behind the header;

the swath converging apparatus comprising two assemblies each of at least two rollers with each assembly mounted at a respective side wall of the discharge opening;

the rollers of each assembly each being driven for rotation about its axis in a direction to carry the crop inwardly of the discharge opening;

said at least two rollers of each assembly including an innermost one of the rollers mounted inwardly of an outermost one of the rollers and at least the innermost one of the rollers being mounted so as to be located wholly inwardly of the respective side wall of the discharge opening;

at least the innermost one of the rollers of each assembly being mounted for adjustment movement in a direction inwardly and outwardly of the respective side wall of the discharge opening;

wherein the swath converging apparatus includes an actuator and a linkage driven by the actuator and connected between the two assemblies for effecting common adjustment movement of the innermost rollers of the two assemblies.

22. A crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening defined by spaced upstanding side walls located at a spacing narrower than a width of the cutter bar through which the cut crop is discharged for forming a swath behind the header;

the header frame including two walls each located at a respective end of the header frame and each extending behind at least one of the disks from a respective one of the side walls of the discharge opening outwardly toward the respective end of the header frame such that the cut crop material is converged inwardly in front of the wall to the discharge opening;

and a swath converging apparatus mounted at the discharge opening for converging sides of the swath to be laid on the ground behind the header;

the swath converging apparatus comprising two assemblies each of at least two rollers with each assembly mounted at a respective side wall of the discharge opening;

the rollers of each assembly each being driven for rotation about its axis in a direction to carry the crop inwardly of the discharge opening;

said at least two rollers of each assembly including an innermost one of the rollers mounted inwardly of an outermost one of the rollers and at least the innermost one of the rollers being mounted so as to be located wholly inwardly of the respective side wall of the discharge opening;

wherein each of the rollers is driven by a separate hydraulic motor independently of the others of the rollers.

23. A crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame defining a discharge opening defined by spaced upstanding side walls located at a spacing narrower than a width of the cutter bar through which the cut crop is discharged for forming a swath behind the header;

the header frame including two walls each located at a respective end of the header frame and each extending behind at least one of the disks from a respective one of the side walls of the discharge opening outwardly toward the respective end of the header frame such that the cut crop material is converged inwardly in front of the wall to the discharge opening;

and a swath converging apparatus mounted at the discharge opening for converging sides of the swath to be laid on the ground behind the header;

the swath converging apparatus comprising two assemblies each mounted at a respective side wall of the discharge opening and each including at least one roller;

said at least one roller of each assembly each being driven for rotation about its axis in a direction to carry the crop inwardly of the discharge opening;

said at least one roller being mounted so as to be located wholly inwardly of the respective side wall of the discharge opening;

wherein the cutter bar is arranged underneath the cutter disks for driving the cutter disks;

and wherein there is provided a floor plate extending rearwardly from the cutter bar to a position adjacent said at least one roller and arranged to prevent cut crop from falling to the ground in front of said at least one roller.

* * * * *